(12) United States Patent
Kersch et al.

(10) Patent No.: US 10,595,525 B2
(45) Date of Patent: Mar. 24, 2020

(54) SANCTUARY BED BUG BARRIER

(71) Applicants: Gary L Kersch, Austin, TX (US); Pauline Doorn, Austin, TX (US); Cap Doorn, Austin, TX (US)

(72) Inventors: Gary L Kersch, Austin, TX (US); Pauline Doorn, Austin, TX (US); Cap Doorn, Austin, TX (US)

(*) Notice: Subject to any disclaimer, the term of this patent is extended or adjusted under 35 U.S.C. 154(b) by 234 days.

(21) Appl. No.: 15/890,603

(22) Filed: Feb. 7, 2018

(65) Prior Publication Data

US 2019/0239503 A1 Aug. 8, 2019

(51) Int. Cl.
| | |
|---|---|
| *A47C 31/00* | (2006.01) |
| *A01M 29/34* | (2011.01) |
| *A47G 9/02* | (2006.01) |
| *A47G 9/04* | (2006.01) |
| *A01M 1/20* | (2006.01) |
| *A47C 31/10* | (2006.01) |
| *A47G 9/00* | (2006.01) |

(52) U.S. Cl.
CPC .......... *A01M 29/34* (2013.01); *A01M 1/2094* (2013.01); *A47C 31/007* (2013.01); *A47C 31/105* (2013.01); *A47G 9/0246* (2013.01); *A47G 9/0292* (2013.01); *A47G 9/04* (2013.01); *A47G 2009/001* (2013.01)

(58) Field of Classification Search
CPC .............................. A47C 31/00; A47C 31/007
USPC ...................................................... 5/493-499
See application file for complete search history.

(56) References Cited

U.S. PATENT DOCUMENTS

| | | | |
|---|---|---|---|
| 2012/0137433 A1* | 6/2012 | Snell ................... | A47C 31/007 5/493 |
| 2014/0068868 A1* | 3/2014 | Morzano ............. | A47C 31/105 5/691 |

* cited by examiner

*Primary Examiner* — Fredrick C Conley
(74) *Attorney, Agent, or Firm* — James Robert (Jim) Johnson

(57) ABSTRACT

The invention comprises a plurality of components, each of which impedes or prevents intrusion by bed bugs onto a bed or kill them upon contact. A fitted sheet, impenetrable to bed bugs is removeably attached to a slippery skirt, which is too smooth for a bed bug to climb. Together, these inhibit bed bugs from climbing to the top of the bed from the floor or through the mattress. Zippers to attach the fitted sheet and slippery skirt are designed to prevent small gaps. Headboard and footboard attachments of a slippery skirt design further prevent incursion and form passive traps for encroaching bed bugs. A pesticide infused second skirt attached to the slippery skirt around the bed springs actively kills bed bugs which contact it, reducing the number of bed bugs living in an infested mattress. All parts except the slippery skirts and pesticidal skirt may be washed or heated in a conventional dryer, killing invasive bed bugs, thereby permitting extended use, reuse and higher effectiveness of the invention.

9 Claims, 15 Drawing Sheets

SANCTUARY BED BUG BARRIER

BACKGROUND

Field of the Invention

The present invention is directed to an assembly of components fashioned in a way that when applied to a mattress prevents bed bug infestation from reaching a host through the use of a bite-proof mattress cover (fitted sheet or encasement) and a removable slippery skirt designed to create a bite barrier that prevents *Cimex lectularius* (bed bugs) from climbing upward and/or through the barrier to the top surface of the mattress or sheets. The invention further comprises an optional skirt infused with a pesticide to kill bed bugs that come into contact with the infused skirt. Given that the bite barrier can be compromised in one of a variety of ways, the assembly can be recharged to function at maximum benefit via a clothes dryer heating with the removable slippery skirt component detached from the assembly to avoid compromising the removeable slippery skirt's effectiveness. In this disclosure, the term "recharge" means the ability to kill bed bugs contaminating all or part of the invention through some repeatable process. For example, heating the fitted sheet or encasement in a dryer for a sufficient time kills all live bed bugs and eggs. As a result, when the fitted sheet or mattress cover is again placed on the mattress, the user may be certain the mattress cover is free from infestation. In the event of re-infestation, the mattress cover can be recharged again. The slippery skirt prohibits the travel of *Cimex lectularius* by having a level of smoothness which prevents the bed bug from climbing it. The surface features on the slippery skirt are small enough to prevent the legs of bed bugs from being able to gain traction and climb vertically.

Background of the Invention

*Cimex lectularius* infestations are growing in the US due to the discontinuance of the use of dichlorodiphenyltrichloroethane (DDT) as a pesticide. This has caused a resurgence of *Cimex lectularius* populations since the early 1990's. Current attempts to control the populations are centered on other pesticide sprays, which are ineffective both because the treatment must come into direct contact with the bugs (there are no pesticides with effective residual benefit) and because the bugs have developed the ability to quickly adapt resistance to pesticides, making treatments ineffective on future generations of the bugs. It is recognized that multiple pesticide applications are usually required and normally are distributed throughout a several week application process, during which residents are still subject to *Cimex lectularius* bites. Another known method for killing *Cimex lectularius* is through heat treatment, as *Cimex lectularius* are known to die, at all life stages, when exposed to temperatures of 112.8 degrees Fahrenheit for a sufficient time. However, heat treatments are limited in effectiveness as *Cimex lectularius* are known to flee heat treated areas and return once the lethal heat levels have passed. To effectively heat treat the infested area, it must be completely sealed off to prevent bugs from fleeing. Additionally, infestation is particularly problematic in apartments, hotels, or high rise buildings due to the movement of bugs to adjoining spaces to flee whatever method of extermination is attempted. The lack of a reliable, expedient, and efficient extermination mechanism means that residents continue to be at risk for the physical and emotional trauma of having ongoing *Cimex lectularius* infestations and being fed upon until total elimination can be accomplished. With the duration of most pesticide/insecticide treatments being weeks, and the other methods suffering from a lack of certainty of success for total elimination of the infestation, the lack of physical and emotional relief for the resident during those treatment periods forces the resident to perform call backs to exterminators while also feeling at risk in their own beds of bites as the pests continue to feed.

Even if box springs and mattresses are encased with existing products on the market, residents are still at risk from bugs transferring from the other bed components or through unintentional contamination of the bed coverings. Contaminated pets jumping on top of a bed; sheets, duvets, or comforters hanging over the side of the bed or being placed on the floor overnight; accidentally tracking bugs into the bed by having them latch onto clothing, such as socks or loose pants or pajamas, all represent serious risks for re-contamination to an otherwise protected bedding surface. It is necessary that any protection device not only be able to account for the normal climbing methods of transfer, but is also able to deal with a scenario of repeat or extended contamination of the top protected surface. It is critical that a device be cleaned to the point no live bed bugs are on it when placed back on a bed.

Known methods for treating bed bugs are not able to guarantee full extermination of the infestation, which means residents are vulnerable to being bitten by the bugs after those treatments. Furthermore, because insecticide and pesticide treatments are spread out, residents are particularly vulnerable during the times between treatments as they may take a total of 3 to 4 weeks of repeated visits. Furthermore, even if box springs and mattresses are encased, residents are still at risk from either bugs transferring from the headboard/footboard as described above or through unintentional contamination of the bed coverings. Pets jumping on top of a bed; sheets, duvets, or comforters hanging over the side of the bed or being placed on the floor overnight; accidentally tracking bugs into the bed by having them latch onto clothing, such as socks or loose pants or pajamas, all represent serious risks for re-contamination of an otherwise protected bedding service. As such, it is necessary that any protection device is not only able to account for the methods of transfer, but is also able to deal with repeated recontamination and repeated decontamination.

Description of the Related Art

There exists a variety of related art. One example is a fitted sheet permanently attached to a plastic slippery skirt. This product, however, is a one-time use product as the permanent attachment of the plastic slippery skirt prevents re-use if the components become compromised with a bed bug infestation. The slippery skirt used generally cannot be subjected to the heat of a dryer. This is a significant limitation as there is no guarantee of preventing of bed bugs getting to the top surface of the bed even with the devise in place. Bed skirts, comforters, sheets, pets, or clothing can all transfer bed bugs to the top surface of the fitted sheet despite the efficacy of the unit. The only safe and reliable way to remove the bugs from the compromised devise is to put the entire devise through a dryer for heating (or washing and drying). The permanent attachment of the plastic skirt to the fitted sheet prevents this as exposure to elevated heat renders the slippery skirt ineffective for future use.

Other related art includes a mattress encasement. This is a covering that fully encloses a box springs and/or mattress using a material which is impenetrable to bed bugs. That is to say, the material is of a sufficiently dense weave to prevent bed bugs from burrowing through the materials and tough enough to prevent bed bugs from biting through the material. Encasement, however, only deals with the bed bug populations within the mattress and box springs which they are encasing. This is a problem because statistically only 60% of bed bugs live within the mattress and box springs. Thus, encasements leave residents vulnerable to nearly half of the bugs living elsewhere in the bed components and room. Encasements are also notoriously difficult to place on a mattress or box springs, often requiring at least two people to place them over the mattress and box springs properly. Their permanent installation means they cannot be reused once placed over a mattress or box springs to which they are applied. They are specifically designed to not be removed after initial installation to prevent possible release of the bed bugs they were designed to trap. Since they cannot be removed, they are not a candidate to be put into a dryer to heat treat them to deal with a contamination of the mattress or box springs on its exterior surfaces. Even though the encasements trap and kill all the bed bugs they encase, other bugs remain to bite the resident and perpetuate the infestation and to breed.

Related art also exists in the form of a pesticide fitted sheet. The pesticide sheet is a netting material that has Permethrin pesticide applied to its surfaces. The fitted sheet is applied directly onto the mattress or box springs. As the bed bug climb across it, they are exposed to the pesticide and die. The efficacy of this product has been in question since its release. This product's approach is a problem as many residents are reluctant to install pesticide-infused products directly upon their bed. In addition, the pesticide sheet tends to trap dead bugs within the encasement exposing the user to a distasteful visual experience. Finally, the devise does nothing to prevent ongoing bites or from a pest population growing if the bed or its components are infested prior to installation.

Last, related art includes climb-up traps. Climb-up traps are fitted cups placed underneath the bed posts. The traps are designed to prevent bugs from being able to climb onto the bed from the floor. This product prevents bed infestations from some external sources but does not provide protection for an already infested mattress or box springs or other infested bed components such as headboards and/or footboards. Although this devise is effective to prevent one avenue of access to the bed, it is ineffective against all other exposures to access, such as bedding which touches the floor. It also does nothing to address the proliferation and growing infestation levels on a bed that is infested prior to installing the devise.

SUMMARY OF THE INVENTION

In one embodiment of the present invention, a slippery skirt is attached to a fitted sheet, which may be either a single layer of fabric or multiple layers of fabric, via a bed bug impenetrable zipper that, once placed together on a mattress, serves as a bite-proof, transfer-proof barrier for bed bugs between the top surface of the mattress and the underlying bed components, thereby preventing any bed bugs present from accessing the resident that is on top of the mattress.

In another embodiment of the invention, a slippery skirt is attached to an encasement via a bed bug impenetrable zipper that, once placed upon a mattress, serves as a bite-proof, transfer-proof barrier for bed bugs between the top surface of the mattress and the underlying bed components, thereby preventing any bed bugs present from accessing the resident that is present on top of the mattress.

In another embodiment of the invention, a slippery skirt is attached to a fitted sheet via a bed bug impenetrable zipper that permits separation of the two components to allow for the fitted sheet to be recharged in a dryer at a temperature and duration of time that is lethal to any bed bug infestation.

In another embodiment of the invention, a slippery skirt is attached to a mattress encasement via a bed bug impenetrable zipper that facilitates separation of the two components to allow for the mattress encasement to be recharged in a dryer at a temperature and time duration that is lethal to any bed bug infestation.

In one embodiment of the invention, a slippery skirt is attached to a fitted sheet via a bed bug impenetrable zipper and a second skirt attached to the slippery skirt between the slippery skirt and the mattress/box springs and which is infused with a pesticide to exterminate of the bed bugs as they attempt to navigate the unit to try and feed on the resident.

In another embodiment of the invention, a slippery skirt is attached to an encasement via a bed bug impenetrable zipper and a second skirt attached to the slippery skirt lie between the slippery skirt and the mattress/box springs and which is infused with a pesticide to kill bed bugs which come into contact with the second skirt.

In another embodiment of the invention, a slippery skirt is attached to a fitted sheet via a bed bug impenetrable zipper and a headboard skirt attached to the slippery skirt positioned between the headboard and the mattress/box springs to prevent the top surface of the mattress from being contaminated with bed bugs via contact between the top surface of the mattress and the headboard.

In another embodiment of the invention, a slippery skirt is attached to a encasement via a bed bug impenetrable zipper and a headboard skirt attached to the slippery skirt positioned between the headboard and the mattress/box springs to prevent the top surface of the mattress from being contaminated with bed bugs via contact between the top surface of the mattress and the headboard.

In another embodiment of the present invention, a slippery skirt is attached to a fitted sheet via a bed bug impenetrable zipper and a footboard skirt attached to the slippery skirt positioned between the footboard and the mattress/box springs to prevent the top surface of the mattress from being contaminated with bed bugs via contact between the top surface of the mattress and the footboard.

In another embodiment of the present invention, a slippery skirt is attached to an encasement, via a bed bug impenetrable zipper and a footboard skirt attached to the slippery skirt positioned between the footboard and the mattress/box springs to prevent the top surface of the mattress from being contaminated with bed bugs

DETAILED DESCRIPTION

The following definitions and general principles are made to provide context for the description of preferred embodiments of the invention.

The invention combines components in which each individual component protects against or prevents infestation by bed bugs or which, in the event of infestation, permits the nearly complete elimination of infestation while allowing the invention to be reused. By this combination of components and reuseability, bed bug infestation is first minimized but, critically, in the event of infestation, the level of infestation is equally able to be returned to a minimum, and the ability of an individual consumer to deal with the infestation at a low cost is maximized. The invention is also consumer friendly because unlike most bed bug mattress products, the fitted sheet embodiment can be installed and maintained by a single person without necessary training in procedures for handling bed bug infestations.

Figure 1:
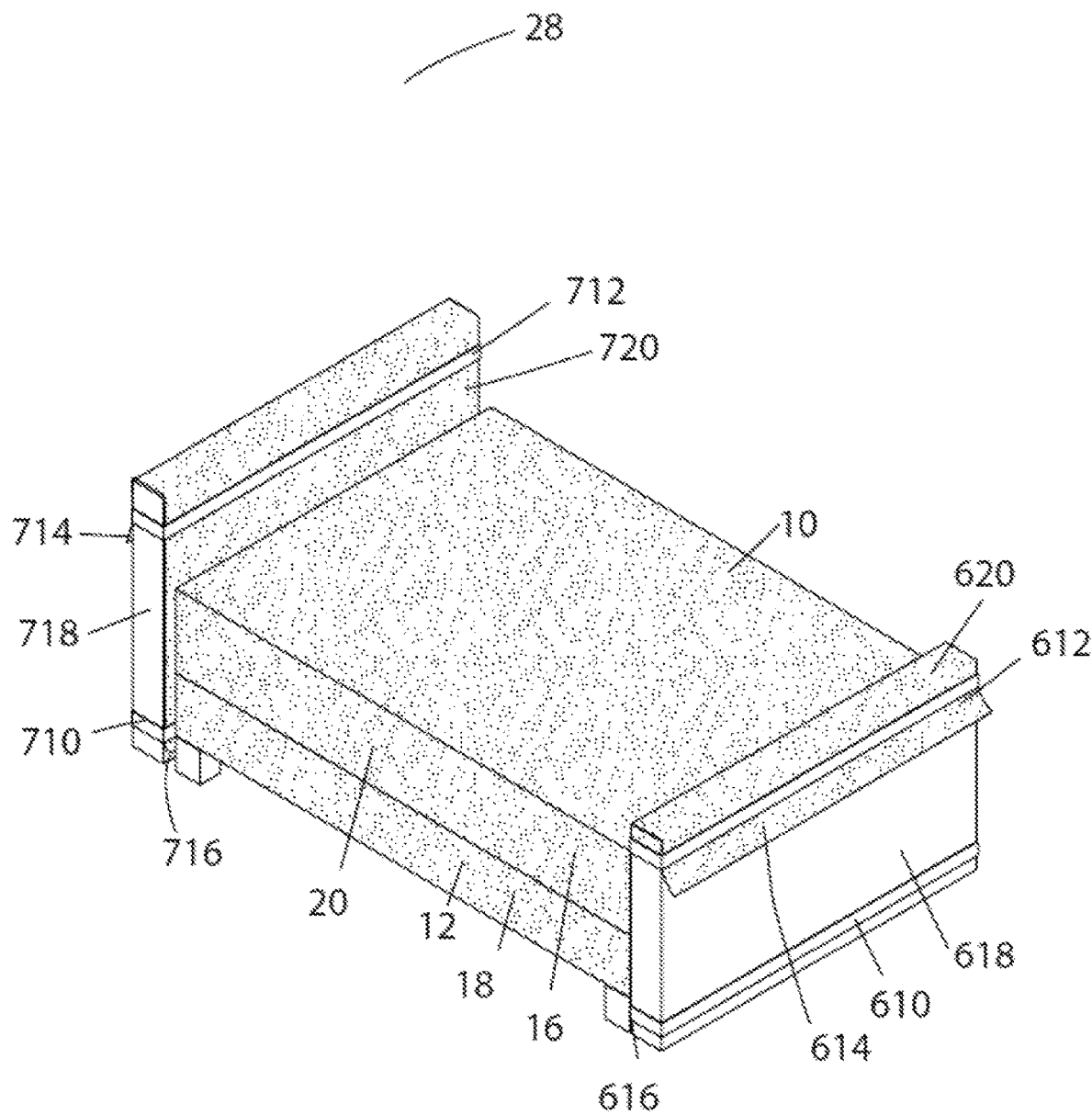
FIG. 1 depicts a perspective view showing the bed bug protection invention encompassing the box springs, mattress, headboard and footboard of a bed.
Figure 4:
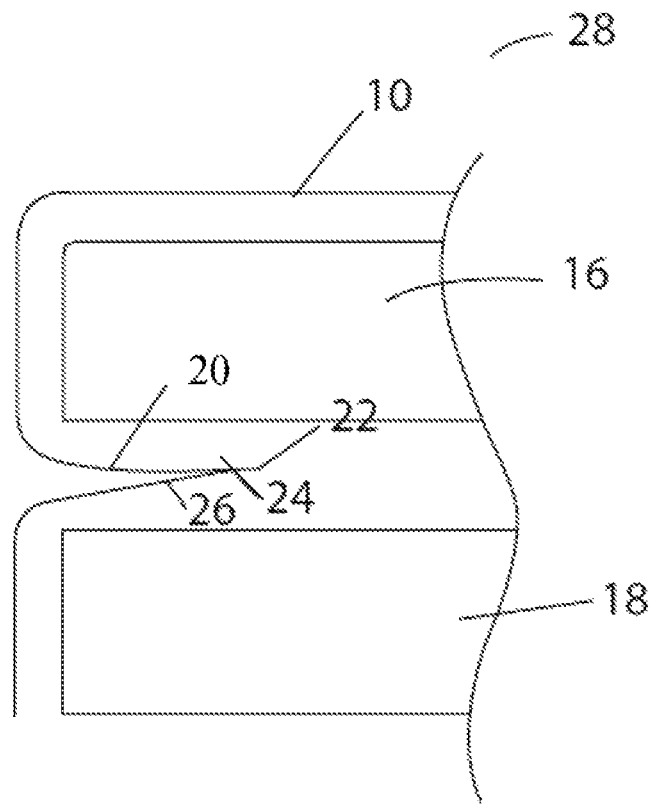
FIG. 4 depicts a partial cross section of the invention utilizing the fitted sheet component to conform to the mattress to ensure sheet will not come off easily or through the regular movement of a person during sleep.
Figure 15:
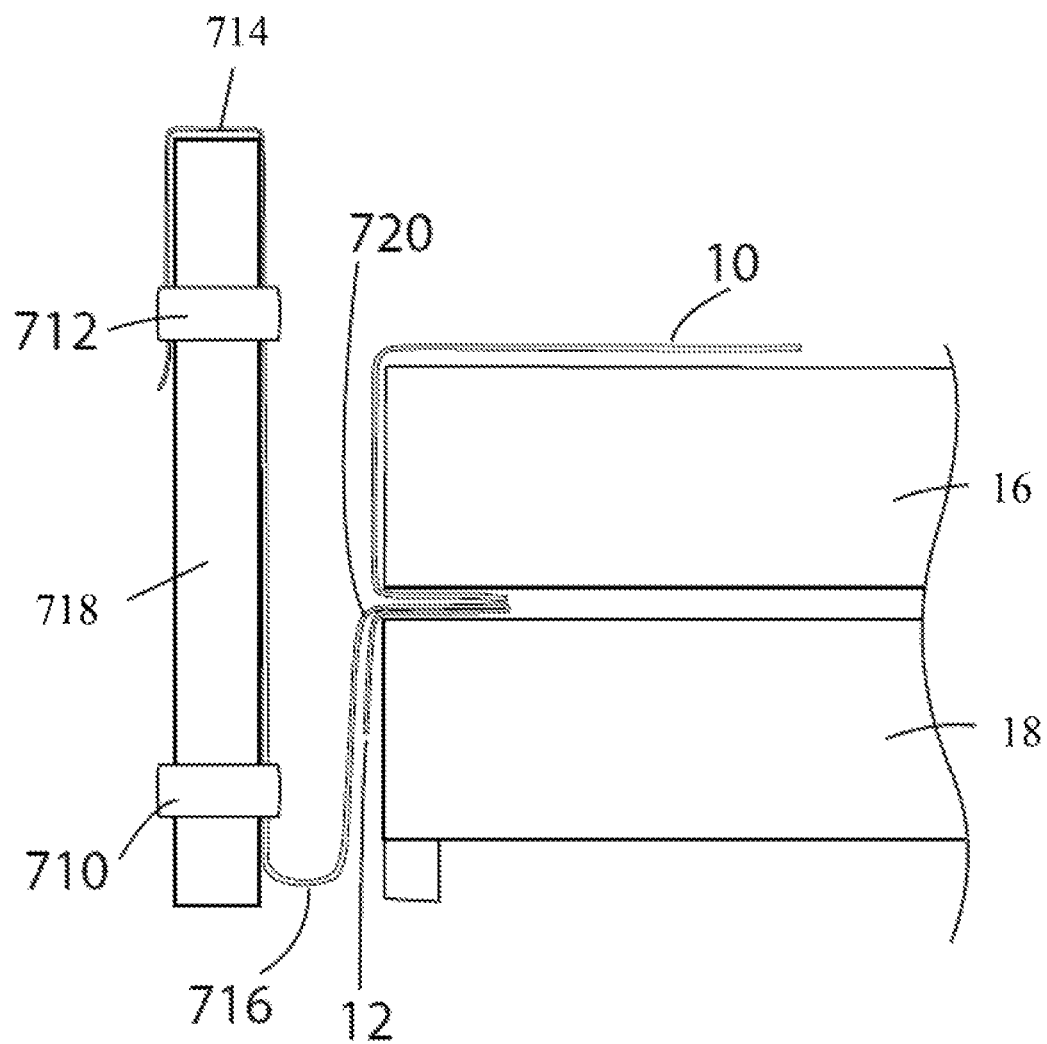
FIG. 15 depicts a Side view of the headboard component which attaches to the headboard through elastic straps creating a pit-fall like trap for bed bugs that attempt to traverse to the top of the mattress by climbing up the headboard.

As depicted in FIG. 1, in the preferred embodiment, the invention's primary component is a one-ply non-porous fitted sheet 10 that prevents the passage of *Cimex lectularius* or its proboscis through the fitted sheet 10. As depicted in FIG. 4, fitted sheet 10 is attached via a removable but enclosed zipper 26 to an attachment component 24 which is then removeably attached to a slippery skirt 12 via the zipper 26. The smoothness of the slippery skirt 12 prevents bed bugs from climbing toward the fitted sheet 10 from the floor. In the event a bed bug somehow gets into the box springs 18, as depicted in FIG. 15, and then into the mattress 16, the fitted sheet 10 not only serves as a bed covering but also works to prevent bed bugs from being able to bite a host that sits or lies atop the sheet 10. This is achieved by making the fitted sheet 10 from a fabric that is woven tightly enough to create too narrow of a passage for the biting component of the bed bug to pass through. Even if bugs presently infest the mattress, they will have no access to the host as a result of the impenetrable fabric of fitted sheet 10. Although a one-ply fitted sheet is depicted here, other embodiments prevent the use of more than one layer of materials in which each layer of material provides an additive form of infestation protection similar to the total protect of the one-ply. Such single layer and multi-layer fabrics are known in the field.

As used herein, "slippery surface" means a low friction, sufficiently smooth, surfaces. *Cimex lectularius* are able to traverse any surface when placed horizontally; however, they experience great difficulty traversing low-friction surfaces as the incline of the surface increases eventually reaching a point of impassability. A vertical low-friction surface thus presents an unclimbable surface for *Cimex lectularius*.

As used herein, "barrier" or "impenetrable surface" means a material through which *Cimex lectularius* can neither pass nor penetrate with their feeding elements.

As used herein, "fitted sheet" means a covering for a mattress which utilizes an elastic or similar material to conform to the shape of the mattress and attach snuggly.

As used herein, "outer surface" means the wall of the invention facing away from the potentially infested object.

Conversely "inner surface" means a surface of the device facing toward the potentially infested object.

As used herein, "top surface" means an outer surface of the device upon which pets, humans, hosts, and bedding/pillows may rest and is the top surface of the fitted sheet component.

As used herein, "skirt" means an arrangement of material which drapes downwards covering the mattress and/or box springs to the floor of the bedding arrangement.

As used herein, "attachment component" 24 means a portion of the single-ply material which connects from the fitted sheet component and hangs outward and down which then connects, via a removable zipper, to the slippery skirt.

As used herein "pesticide treatment" means an optional treatment of the interior of the slippery surface skirt which are safe for human proximity and lethal to *Cimex lectularius*.

As used herein "button cap" means an embodiment of the closure mechanism for the enclosed zipper wherein a plastic cap is attached via string to the end of the zipper head and is able to be attached via metal fasteners placed both upon the slippery skirt component as well as the fitted sheet component creating a seal around the end of the zipper trail which prevents passage of *Cimex lectularius* through the opening at the end of the zipper trail.

As used herein "pill cap" means an embodiment of the closure mechanism for the enclosed zipper wherein a plastic oval shaped cap is attached via a hinge to the top of the slippery skirt and is able to be attached via fasteners on the fitted sheet component above the zipper trail creating a seal around the end of the zipper trail which prevents passage of *Cimex lectularius* through the opening at the end of the zipper trail.

As used herein "Command Pro fasteners" or words or phrases of similar effect shall mean an embodiment of the closure mechanism for the enclosed zipper wherein a layer of 3M's Command Pro fastener is attached to the inside surface of the slippery skirt, with the seam of the attachment running along the longer side of the Command Pro fastener and spanning the gap of the end of the zipper trail with the fastener facing inwards.

Figure 2:
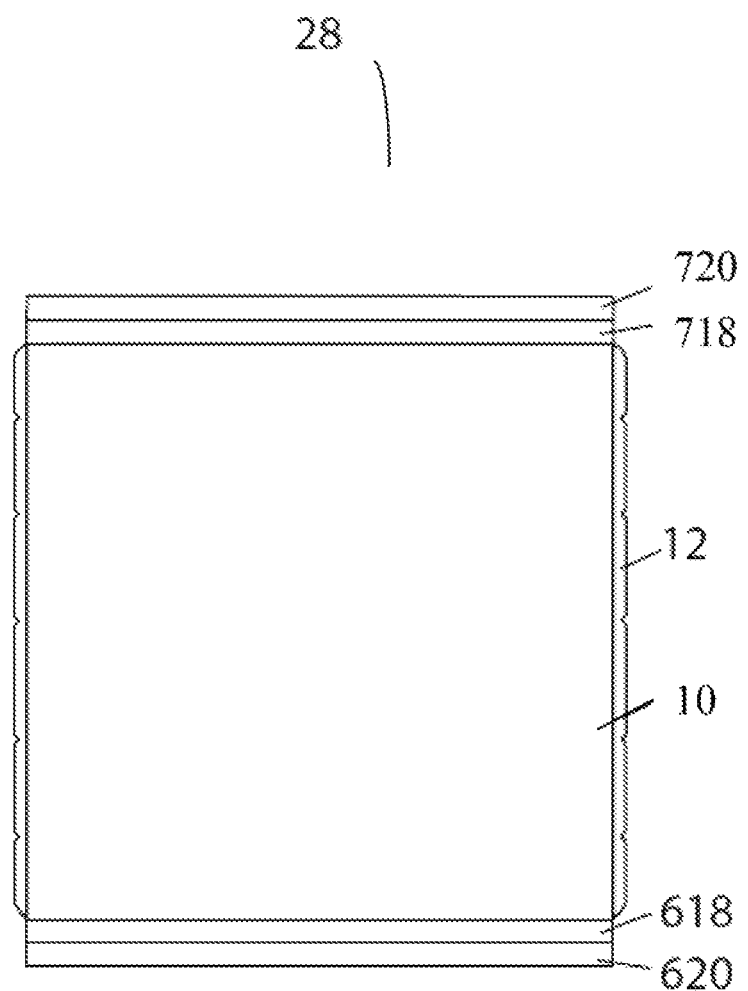
FIG. 2 depicts a view of the invention encompassing the bed from a top-down perspective.
Figure 3:
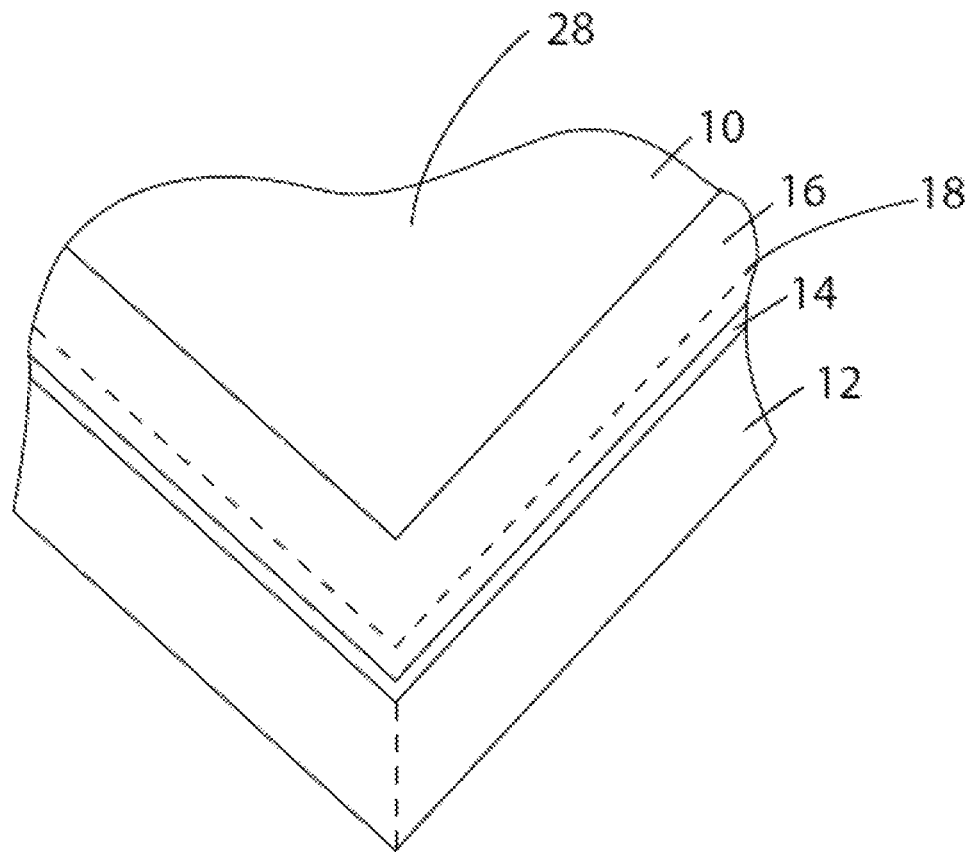
FIG. 3 depicts a partial cut perspective view of the invention depicting the invention on the corner of a mattress and box springs assembly.

With the foregoing in mind, referring to the drawings wherein like or similar references indicate like or similar elements throughout the several views, there is shown in FIG. 1 shows a complete incorporation of all elements of the bed bug sanctuary 28 with footboard 614 and headboard 714 attachments. As shown also in FIG. 3 fitted sheet 10 fits to mattress 16 as a standard fitted sheet, with slippery skirt 12 extending downward to cover the outside of box springs 18. FIG. 2 depicts a top down view of fitted sheet 10 in place over mattress 16.

Referring to FIG. 4, bed bug sanctuary 28 is comprised of material that can be folded for storage and transport and allows for easy placement over a mattress wherein the elastic 22 of the fitted sheet 10 can be attached to the bottom of the mattress without forming a complete seal over the mattress. The elastic 22 allows the device to sufficiently attach to a mattress such that the likelihood the device falls off the bed is minimized. The removeably attached slippery skirt 12 component prevents vertical travel of *Cimex Lectularius* by being too smooth for the bed bugs to climb.

Fitted sheet 10 is made of a material such as to prevent the proboscis of the *Cimex lectularius* from being able to feed on the host from underneath the surface. Fitted sheet 10 can be made of a material with either sufficiently small enough pores that the bed bug proboscis is not able to go through the material or by layering another non-porous material on top of the fabric to create a barrier.

Figure 5:
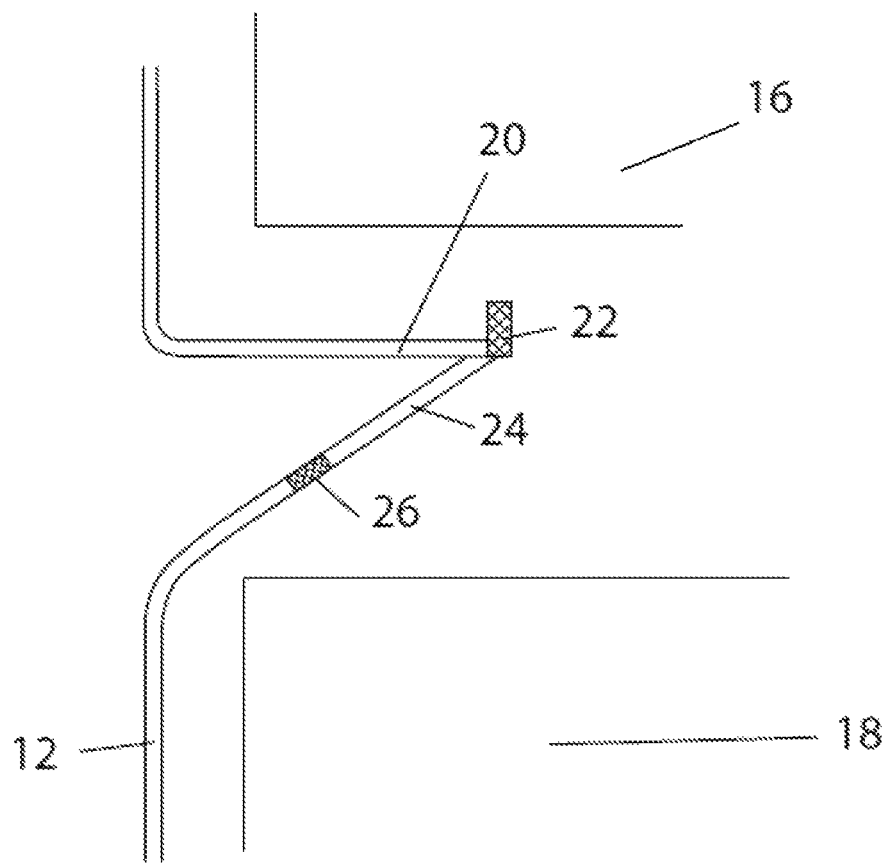
FIG. 5 depicts a partial cross section of the invention showing the attachment point of the slippery skirt relative to the edge of the box springs so as to cover the anything below the mattress.

As depicted in FIG. 5, attachment component 24 is fixedly attached to fitted sheet 10 at elastic 22. Attachment component 24 connects to slippery skirt 12 by zipper 26. The zipper 26 has one half the zipper trail fixedly attached to each of attachment component 24 and slippery skirt 12. Attachment component 24 and zipper 26 allow for the slippery skirt component 12 to be completely removable such that fitted sheet 10 and attachment component 24 may go through an ordinary wash and dry to kill any bugs that gain access to fitted sheet 10 without compromising the functionality of the device or slippery skirt 12.

Figure 6:
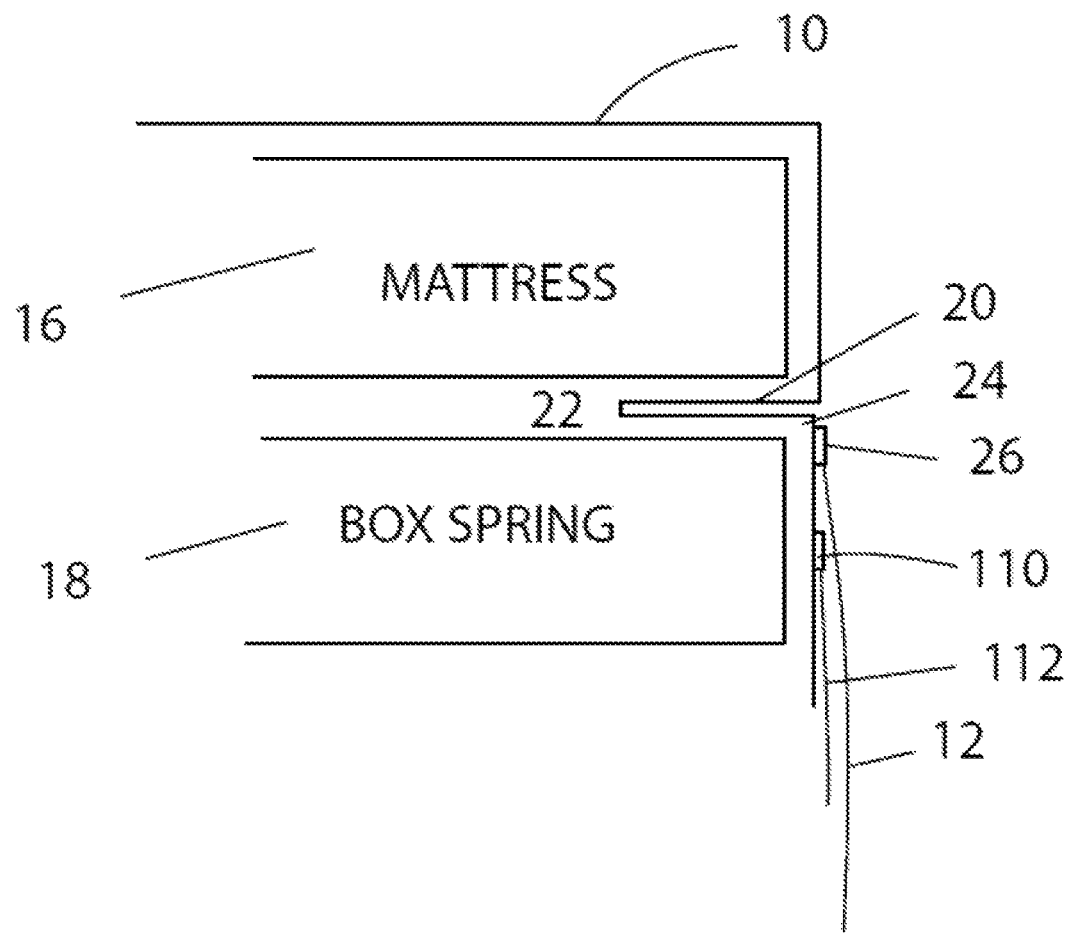
FIG. 6 depicts a partial cross section of the two different skirts depicting two skirts used together, with one skirt being slippery and the other being the a skirt treated with a pesticide.

FIGS. 4, 5, and 6 depict details how fitted sheet 10, elastic 22, attachment component 24, and zipper 26 fit over mattress 16 and hold slippery skirt 12 in place over box springs 18. FIG. 6 further shows the placement of a pesticide skirt 112 and the placement of a pesticide skirt zipper 110 for the pesticide skirt 112.

Referring to FIG. 6, pesticide skirt 112 is attached to the slippery skirt 12 at a point where the slippery skirt 12 is proximal to the top edge of the vertical side of a standard box spring 18 via a zipper 110. The pesticide skirt 112 uses the same type of bed bug proof zipper as the slippery skirt 12 attachment of the fitted sheet 10. The pesticide skirt extends outwardly and down and is position on the interior side of the slippery skirt 12 and has a shorter length than slippery skirt 12. The pesticide skirt 112 is infused with a pesticide known to be lethal to *Cimex lectularius*. The short length of the pesticide skirt 112 limits the possibility of contact by a user with the pesticide skirt 112.

Figure 7:
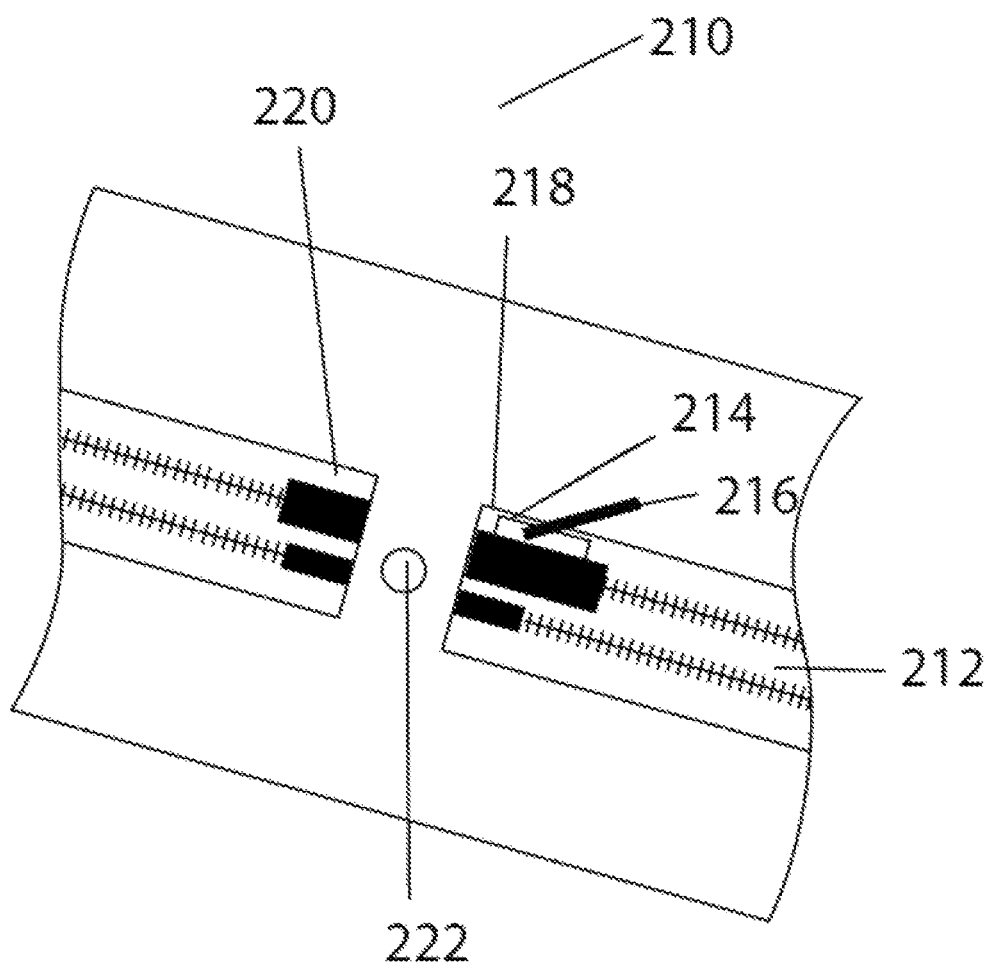
FIG. 7 depicts a detail of the zipper which allows the skirt to be removable through a gap between the ends of the zipper trails which allows the zipper head to fully remove itself from the track.

FIGS. 7 through 13 depict various embodiments of the bed bug proof zipper which are designed to prevent a gap or access point for bed bugs between fitted sheet 10 and slippery skirt 12. Zipper 210 in FIGS. 7 through 13 is the same zipper 26 identified in FIG. 5. To be bed bug proof, zipper 210 must be constructed from parts which are each able to prevent bed bug incursion, such as a cloth or mesh mounting strip 218 woven tightly and zipper teeth 212 which interlock tightly enough to prevent incursion by bed bugs. Referring to FIG. 7, zipper 210 comprises a mounting strip 218, zipper teeth 212 and zipper head 214 which is pulled to close the zipper 210. In use, the slippery skirt 12 has a height and a length. The height of the slippery skirt 12 must be from approximately the floor of the room in which the bed is placed to the top of the box springs 18 on which the bed bug sanctuary 28 is used. The length of the slippery skirt 12 must be as long as the length of the elastic 22 on the fitted sheet 10 so that each half of the zipper 210 can be mounted on each of the fitted sheet 10 and slippery skirt 12 to allow the zipper 210 to form a sealed attachment between the fitted sheet 10 and slippery skirt 12 when placed on the bed. Likewise, slippery skirt 12 must be long enough to cover the perimeter of the bed on which it is used. To make a closure small enough to prevent bed bug incursion, the zipper head 214 is pulled to the end of zipper teeth 212, there is a gap 222 between the end of the zipper teeth 212 and the zipper head 214. In order for this bed bug sanctuary 28 to be effective, gap 222 must be covered, as described in FIG. 8 through 13.

Figure 8:
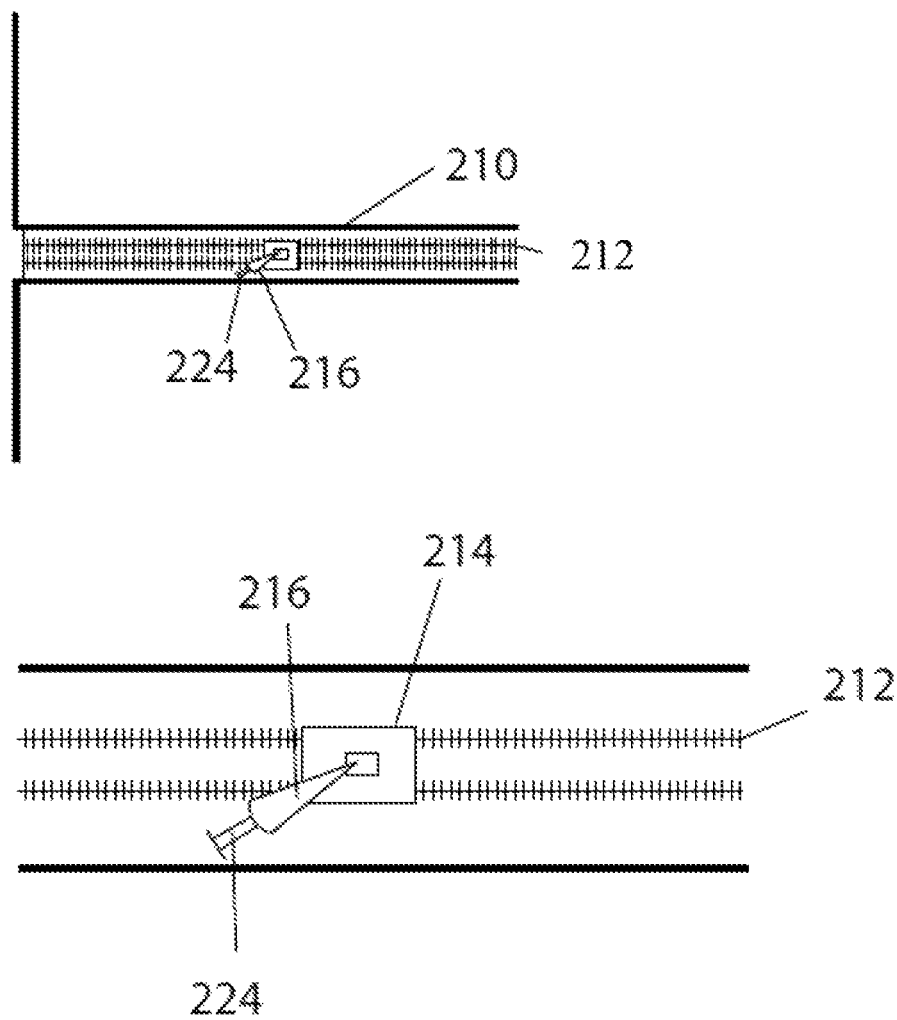
FIG. 8 depicts a detail of an embodiment of the enclosable zipper mechanism using an I-hook to draw the zipper head across a gap and create a sealed enclosure.

FIG. 8 depicts an embodiment of the zipper 210 that locks the zipper head 214 in place to prevent the zipper 210 from becoming unzipped on its own accord and to prevent the passage of *Cimex lectularius* through gap 222 (as depicted in FIG. 7). In FIG. 8, the zipper head 214 is in the locked position forming a complete circuit and the pull tab 216 is affixed in place through an I-hook 224. The I-hook 224 pulls the zipper head 214 taut and is permanently affixed to the slipper skirt 12.

Figure 9:
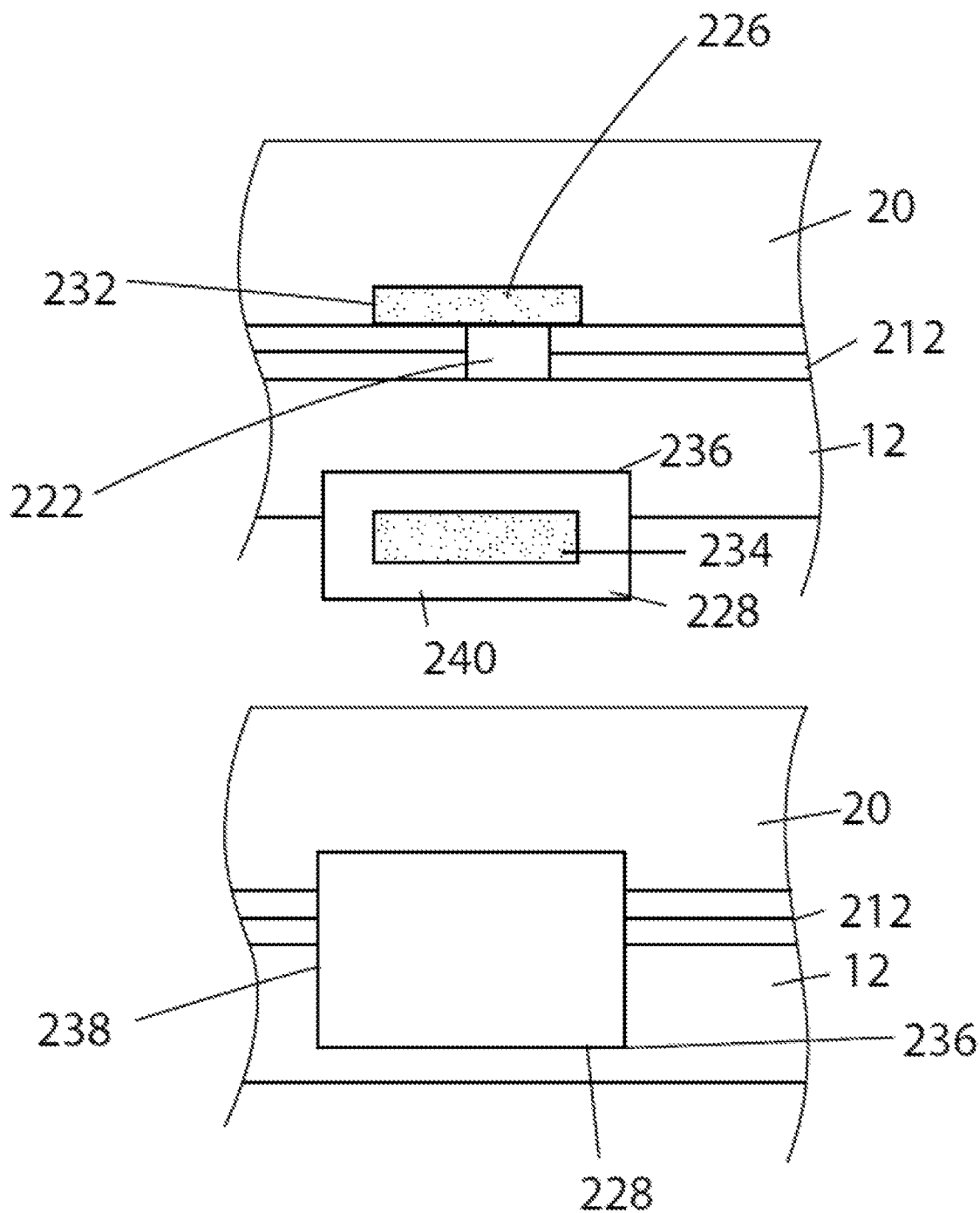
FIG. 9 depicts a detail of another embodiment of the enclosed zipper mechanism which uses a hook-and-loop mechanism to affix a flap over the opening of the zipper with the flap being attached to the slippery skirt component such that it is also detachable.

FIG. 9 depicts another embodiment of the zipper enclosure mechanism that locks the zipper head in place to prevent the zipper from becoming unzipped of its own accord and to prevent the passage of *Cimex lectularius* through the gap 222. The embodiment is comprised of a hook and loop attachment 240 comprising a flap covering 228 made of the same material as the slippery skirt 12 which covers the zipper head 214 (not shown) and end of zipper 210 creating a seal over the gap 222. The flap covering 228 is affixed to the slippery skirt 12 with a loop attachment 232 being affixed to the flap 228 and the hook attachment 234 being affixed to the fitted sheet 10 of the bed bug sanctuary. The flap covering 228 thus moves from the slippery skirt 12 to attach to the hook component 234 to create the seal over the gap 222 and zipper 210. FIG. 9 depicts the flap covering 228 in both its open position and closed and sealed position.

Figure 10:
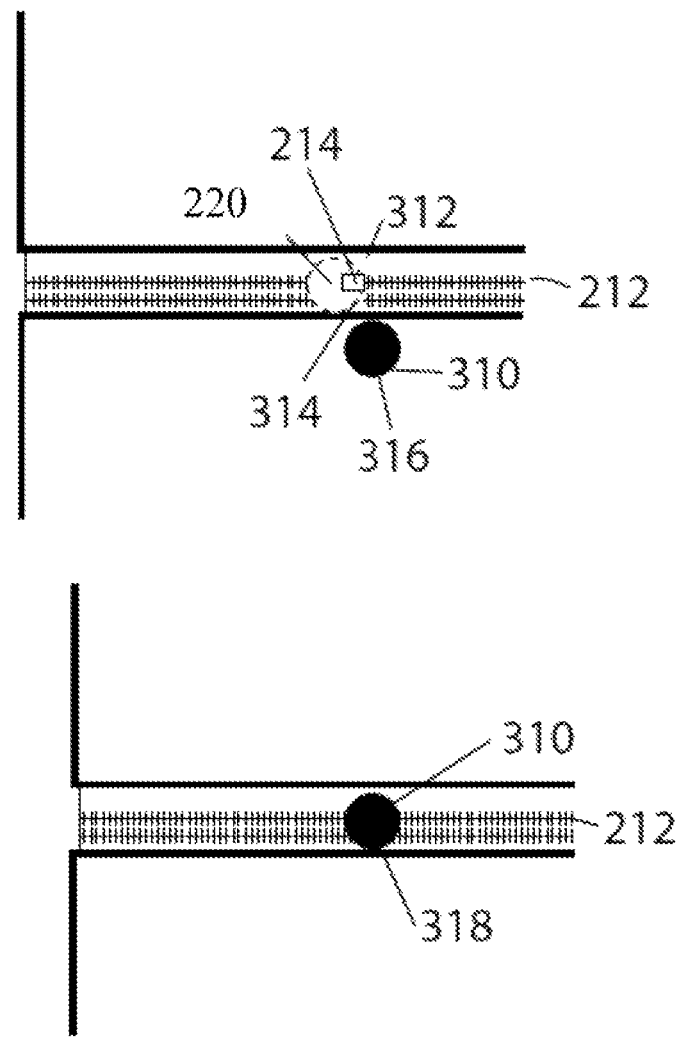
FIG. 10 depicts a plastic button seal embodiment of the enclosed zipper mechanism.

FIG. 10 depicts an embodiment of a zipper head 214 that locks the zipper head 214 in place to prevent the zipper 210 from becoming unzipped of its own accord and to prevent the passage of *Cimex lectularius* through the gap 222. In FIG. 10, the embodiment is comprised of a button cap 310 which is fitted and attaches to both the slippery skirt 12 and fitted sheet 10 through button cap fasteners 312. When the button cap 310 is in aligned with the fasteners 312, a complete circuit is formed covering the zipper head 214 and the gap 222. In FIG. 10, the button cap 310 is depicted in both its open and closed positions.

Figure 11:
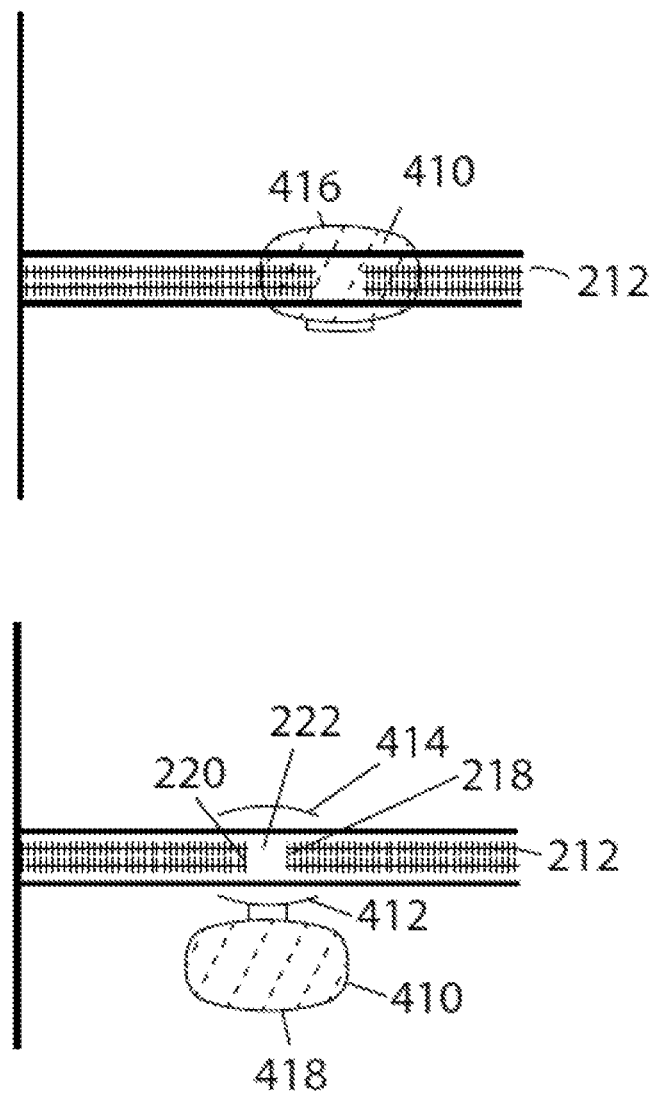
FIG. 11 depicts a pill cap embodiment of the enclosable zipper mechanism component.

FIG. 11 depicts an embodiment of the zipper enclosure mechanism that locks the zipper head 214 in place to prevent the zipper from becoming unzipped of its own accord and to prevent the passage of *Cimex lectularius* through the gap 222. This embodiment comprises the use of a pill cap 410. The pill cap 410 is a hinged cap that takes the form of an oval which has a hinge 412 on the slippery skirt 12 and attaches upwards to a fastener 414 on the attachment component 24. When the pill cap 410 is aligned with the fastener 414, a complete circuit is formed covering the zipper head 214 and the gap 222. The pill cap is depicted in both its closed and open positions.

Figure 12:
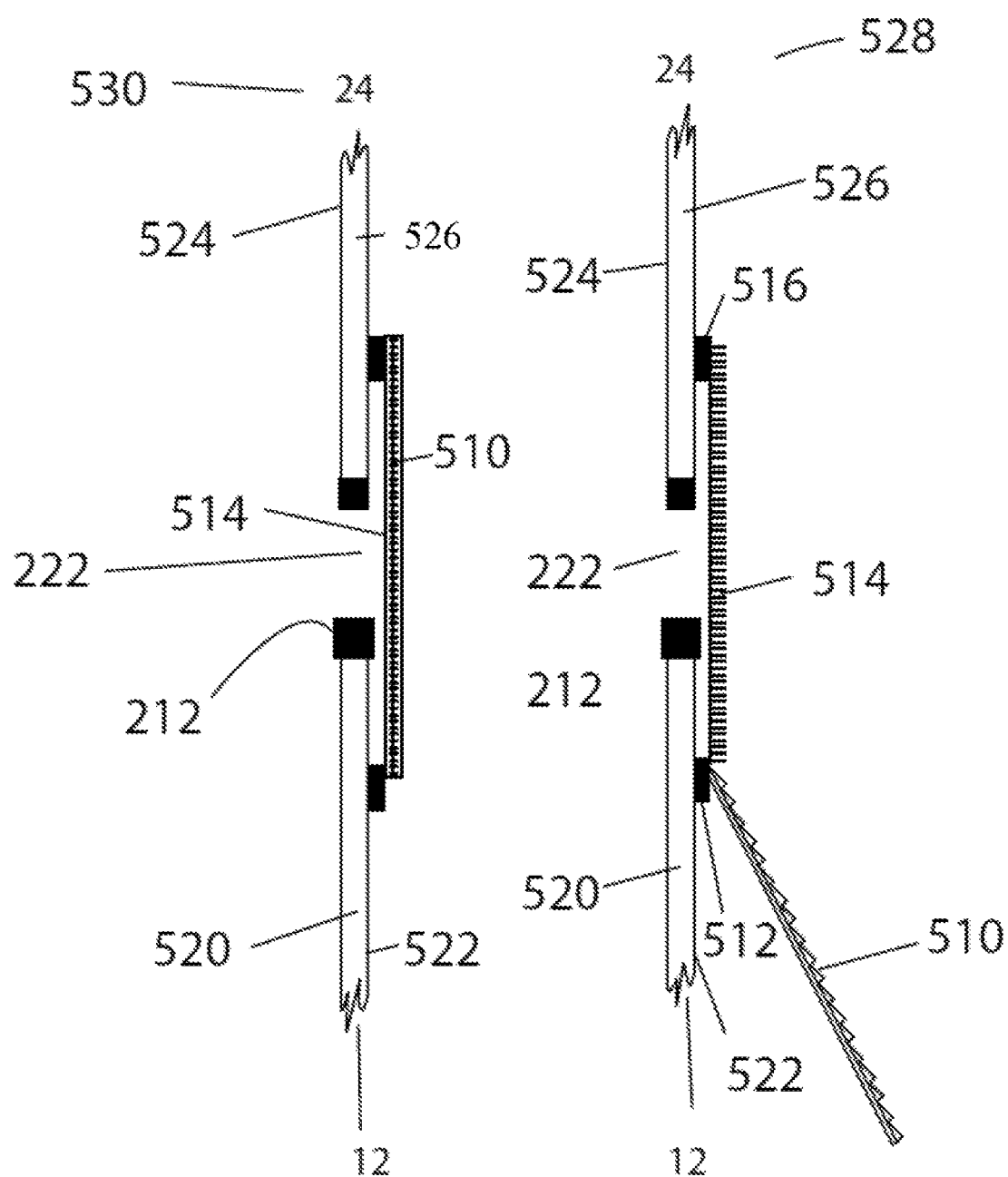
FIG. 12 depicts a side view of the 3M Command Pro preferred embodiment of the enclosable zipper mechanism component.
Figure 13:
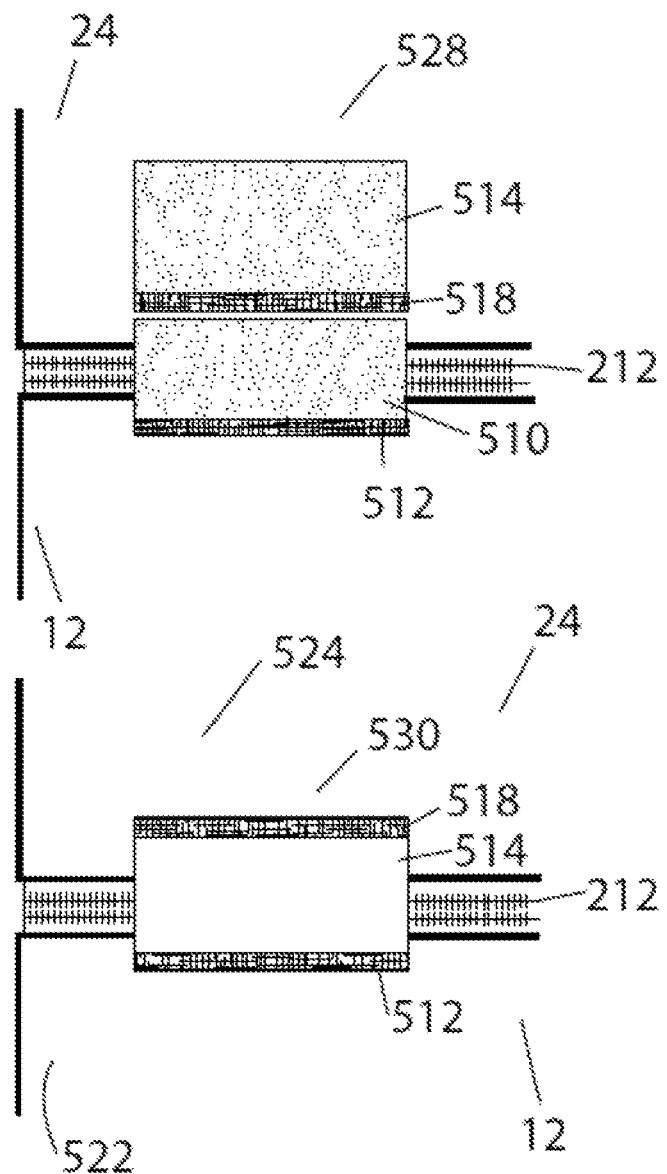
FIG. 13 depicts a view of the 3M Command Pro strips position on an enclosable zipper mechanism.

FIGS. 12 and 13 depict embodiments of the zipper enclosure mechanism that locks the zipper head in place to prevent the zipper from becoming unzipped of its own accord and to prevent the passage of *Cimex lectularius* through the gap 222. FIG. 12 shows a set of 3M Command Prom fasteners 510 and 514 which are affixed to the interior surface 512 of the slippery skirt 12 and the interior surface 526 of the attachment component 24 respectively. The fasteners 510 and 514 are oriented such that they are on the interior surface 522 of slippery skirt 12 and the interior surface 526 of attachment component 24 so as not to interfere with the zipper 212. The fastener 514 attached to the attachment component 24 is affixed with a rigid seam 516 such that the fastener is always maintained at a sufficiently vertical position. Fastener 510 spans the length of the gap 222 and when fastener 514 is attached there is a complete circuit that blocks passage from the interior of the zipper 212 to the exterior surface 520 of the slippery skirt 12 or the exterior surface 524 of attachment component 24. Fastener 510 is affixed to the interior surface 522 of the slippery skirt component 12 and is also oriented such that when not affixed, a hard surface of the fastener 510 is facing the interior of the device. Fastener 510 is attached via a hinged seam 512 which allows for the fasteners 510 and 514 to be fixedly attached or removeable. FIG. 12 details a side view of the device when the fasteners 510 and 514 are not affixed to one another showing the hard seam 516 holding fastener 514 in place over the zipper 210 in the open position. There is also a view wherein fasteners 510 and 514 are attached, completing the circuit in a closed position. FIG. 12 reveals also the flexibility of the hinged seam 512, which allows for fastener 510 to attach to and detach from fastener 514.

FIG. 13 depicts a view of the 3M Command pro fasteners 510 and 514 from the interior of the device. Both the open and closed perspectives are shown. This perspective details how the circuit of fastener 510 attaching to 514 would be completed without interfering with the movement of the zipper head 214 along the zipper 212.

Figure 14:
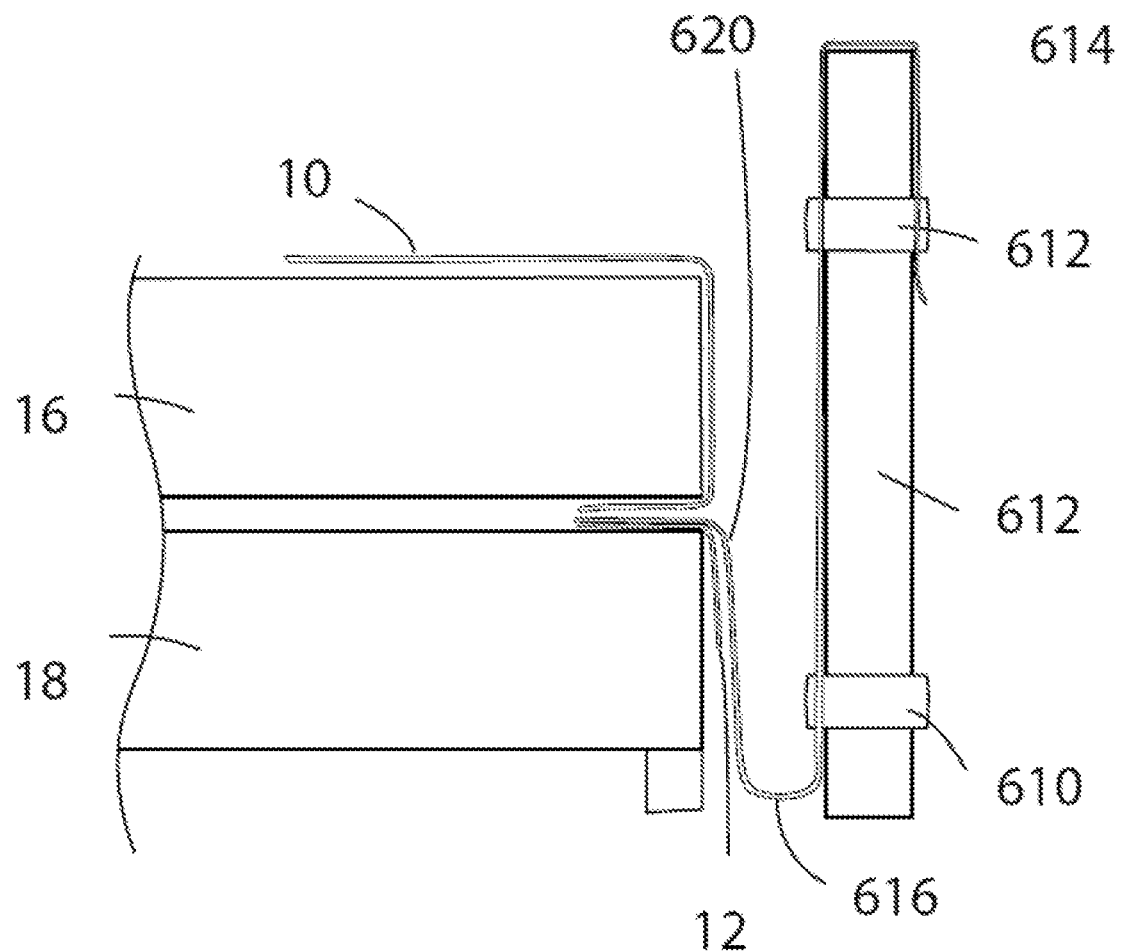
FIG. 14 depicts a side view of the footboard component which attaches to the footboard through elastic straps creating a pit-fall like trap for bed bugs that attempt to traverse to the top of the mattress by climbing up the footboard.

FIG. 14 depicts the footboard attachment 620 portion of the bed bug sanctuary 28. The footboard attachment 620 is made of the same slippery material as the slippery skirt 12 so as to prevent the passage of *Cimex lectularius*. The footboard attachment 620 is attached securely to the footboard 618 by using elastic straps 610 and 612. The elastics straps 610 and 612 ensure that the footboard attachment 620 does not fall off the footboard 618 due to gravity. The footboard attachment 618 is sufficiently long such that when placed properly the top elastic strap 612 has sufficient overhang 614 to keep it secured but allows for slack between the footboard 618 and the bed surface which creates a trap 616. Trap 616 operates as a pitfall trap for *Cimex lectularius* which attempt to gain access to the fitted sheet 10 through the footboard 618 as they will fall into the trap 616 and the slippery surface will prevent the bugs from being able to escape. This not only inhibits the passage of the bugs but also operates as a passive extermination tool. Overhang 614 may be removeably affixed to footboard 618 by any suitable temporary affixing device.

FIG. 15 depicts the headboard attachment 720 portion of the bed bug sanctuary 28. The headboard attachment 720 is made of the same slippery material as the slippery skirt 12 so as to prevent the passage of *Cimex lectularius*. The headboard attachment 720 is attached securely to the headboard 718 by using elastic straps 710 and 712. The elastics straps 710 and 712 ensure that the headboard attachment 720 does not fall off the headboard 718 due to gravity. The headboard attachment 718 is sufficiently long such that when placed properly the top elastic strap 712 sufficient overhang 714 to keep it secure but allows for slack between the headboard 718 and the bed surface to create a trap 716. Trap 716 operates as a pitfall trap for *Cimex lectularius* which attempt to gain access to the fitted sheet 10 through the headboard 718 as they will fall into the trap 716 and the slippery surface will prevent the bugs from being able to escape. This not only inhibits the passage of the bugs but also operates as a passive extermination tool in that the trapped bed bugs will ultimately starve to death in the trap. Overhang 714 may be removeably affixed to footboard 718 by any suitable temporary affixing device.

We claim:

1. An apparatus for preventing bed bug infestation comprising:
    a fitted sheet suitable to be placed on a mattress further comprising one or more layers of bedding material woven densely enough to prevent bed bug penetration through the bedding material and having an elastic perimeter and an adjacent attachment component on which is disposed one half of a bed bug proof zipper and
    a slippery skirt made from a material with a surface roughness sufficiently smooth to prevent bed bugs from climbing vertically on the slippery skirt and further having one half of a bed bug proof zipper disposed along a long edge of the slippery skirt and
    in which the slippery skirt is disposed along the entire circumference of the fitted sheet so as to cover the box springs on which a mattress may be disposed and
    in which the slippery skirt is removeably attached to the fitted sheet by the use of the bed bug proof zipper.

2. The apparatus of claim 1 in which a slippery skirt material is inserted between the mattress and box springs of a bed, extending outward and downward therefrom to form a pocket to trap bed bugs and upward from the pocket to be removeably affixed to either the headboard or footboard of a bed.

3. The apparatus of claim 1 in which the fitted sheet may be detached from the slippery skirt by the use of a zipper suitable to prevent the penetration of bed bugs, thereby permitting the washing and drying of the fitted sheet in consumer or commercial washing and drying machines or the placement of the fitted sheet into a consumer or commercial dryer to be heated for a period of time sufficient to kill aby bed bugs or bed bug eggs.

4. The zipper of claim 3 in which the zipper head is secured in place by use of an 1-hook.

5. The zipper of claim 3 in which a flap sealed using a hook and loop device is releasably sealably placed over the zipper head to prevent bed bug penetration.

6. The zipper of claim 3 in which a button cap is releasably attached over the zipper head to prevent bed bug penetration.

7. The zipper of claim 3 in which a pill cap is releasably attached over the zipper head to prevent bed bug penetration.

8. The zipper of claim 3 in which a set of 3M Command Pro™ fasteners are attached to a flap suitable to be removeably placed over the zipper head to prevent bed bug penetration.

9. A reusable apparatus for the prevention and control of bed bugs on a bed comprising:
- a washable and dryable fitted sheet suitable to be placed for use on a mattress;
- to which is removeably attached around the entire perimeter of the fitted sheet a slippery skirt disposed along the circumference of a box spring set of a bed
- used in conjunction with a slippery skirt having incorporated therein a pocket trap disposed between the mattress and one or both of the headboard and footboard of the bed
- in which the slippery skirt removeably attached to the fitted sheet and the slippery skirt disposed on either or both of the headboard and footboard of a bed prevent the direct incursion of bed bugs on the bed and further in which either washing and drying or drying the fitted sheet kills bed bugs or bed bug eggs and
- in which the fitted sheet and the slippery skirt removeably attached around the perimeter of the fitted sheet are removeably attached using a be bug proof zipper.

* * * * *